J. F. FRANKE.
WALNUT PICKER.
APPLICATION FILED SEPT. 19, 1918.

1,298,923.

Patented Apr. 1, 1919.

INVENTOR.
JOHAN FRIEDRICH FRANKE
BY
ATTORNEYS.

UNITED STATES PATENT OFFICE.

JOHAN FRIEDRICH FRANKE, OF SANTA ANA, CALIFORNIA.

WALNUT-PICKER.

1,298,923.  Specification of Letters Patent. Patented Apr. 1, 1919.

Application filed September 19, 1918. Serial No. 254,856.

*To all whom it may concern:*

Be it known that I, JOHAN FRIEDRICH FRANKE, a citizen of the United States, residing at Santa Ana, in the county of Orange and State of California, have invented new and useful Improvements in Walnut-Pickers, of which the following is a specification.

My object is to make a walnut picker and my invention consists in the novel features herein shown, described, and claimed.

Figure 4:
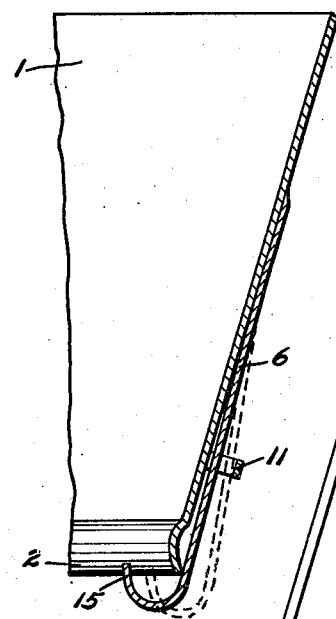
Fig. 4 is a fragmentary vertical sectional detail and taken on the line 4—4 of Fig. 3.
Figure 2:
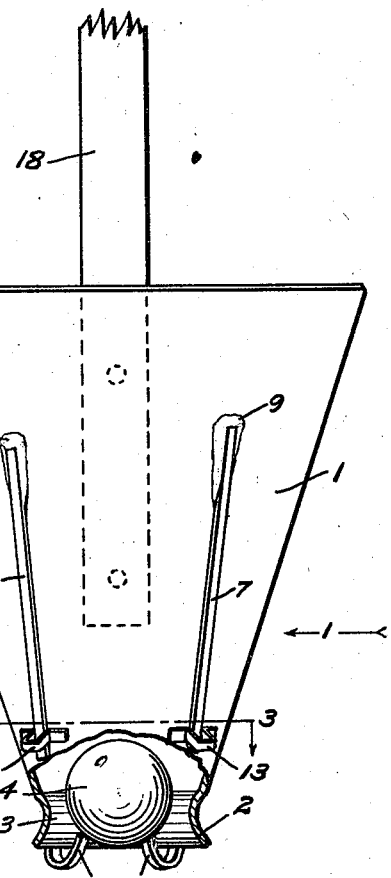
Fig. 2 is an enlarged front elevation looking in the direction indicated by the arrow 2 in Fig. 1, parts being broken and shown in section.
Figure 1:
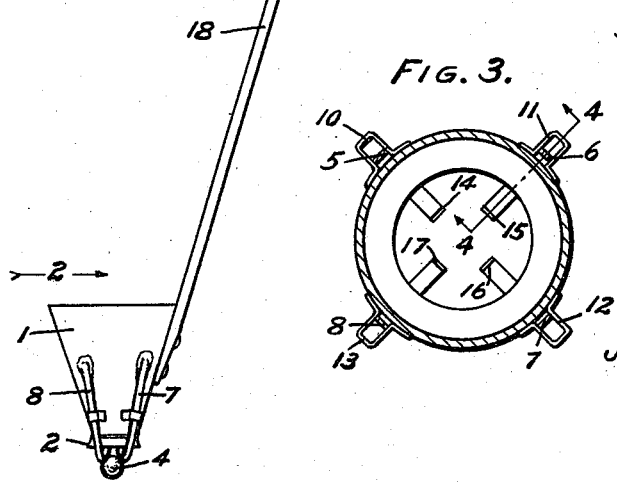
Figure 1 is a side elevation showing a walnut picker embodying the principles of my invention in operation, and as seen looking in the direction of arrow 1 in Fig. 2.
Figure 3:
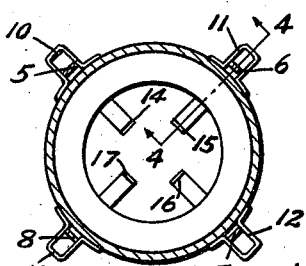
Fig. 3 is a horizontal sectional detail on the line 3—3 of Fig. 2 and looking downwardly.

The container 1 as shown is formed of sheet metal and the container is preferably funnel shape in elevation or vertical cross section. The container 1 is open at the top and has a circular flaring mouth 2 leading upwardly through the bottom, the passage 3 upwardly through the mouth being larger than the walnut 4. Spring fingers 5, 6, 7, and 8 are arranged radially against the outer face of the container 1, and the upper ends of the spring fingers are secured to the body of the container by solder 9. Bearing loops 10, 11, 12, and 13 are soldered to the outer face of the container 1 and the fingers 5, 6, 7, and 8 extend downwardly through these loops; the tensions of the fingers being exerted to throw their lower ends inwardly against the face of the container, and the loops serving to limit the outward movement of the fingers. The fingers 5, 6, 7, and 8 extend below the mouth 2 and the lower free ends 14, 15, 16, and 17 of the fingers are turned inwardly and upwardly into the mouth 2. A handle 18 is secured to the container 1, said handle being long enough so that a person may grasp the upper part of the handle and stand erect and reach and pick up a walnut 4 laying upon the ground. The operator will guide the receptacle 1 so that when the receptacle 1 is pressed downwardly the walnut will be engaged by the bends at the lower ends of the fingers 5, 6, 7, and 8 and press the fingers outwardly until the walnut passes upwardly between the ends 14, 15, 16, and 17 and through the mouth 2 to the bottom of the container. Then the fingers will spring inwardly under the walnut and continued operations will force the walnuts upwardly into the container 1, and when desired the walnuts may be emptied from the container 1 into a larger container. With the use of my walnut picker an operator may pick walnuts from the ground among the grass and weeds and leaves and at the same time stand practically erect so as to move freely over the ground.

It is obvious that the container 1 may be perforated sheet metal or woven wire or any suitable material which will hold a small quantity of walnuts and support the fingers 5, 6, 7, and 8.

Various changes may be made without departing from the spirit of my invention as claimed.

I claim:

1. A walnut picker comprising a container having a picking mouth at its bottom when in operating position, and handle for manipulating the container, and spring fingers mounted in the mouth to allow walnuts to pass upwardly through the mouth and to hold the walnuts from passing downwardly.

2. In a walnut picker a container having a picking mouth at its bottom when in operating position and means in the mouth to allow walnuts to pass upwardly through the mouth to the container and to hold the walnuts from passing downwardly through the mouth.

3. In a walnut picker, a container open at the top and having a picking mouth at its bottom when in operating position; an operating handle extending upwardly from the container; and spring fingers secured to the outer face of the container around the mouth and having free ends extending upwardly into the mouth, so that when the container is pressed downwardly upon a walnut lying on the ground the fingers will spread apart and allow the walnut to pass upwardly through the mouth, and so that the operation may be continued until the container is filled with walnuts to the desired extent.

In testimony whereof I have signed my name to this specification.

JOHAN FRIEDRICH FRANKE.

Copies of this patent may be obtained for five cents each, by addressing the "Commissioner of Patents, Washington, D. C."